United States Patent [19]
Hernick

[11] 3,887,043
[45] June 3, 1975

[54] REPLACEMENT PADS FOR BRAKE ASSEMBLIES

[75] Inventor: Jack F. Hernick, Toronto, Ontario, Canada

[73] Assignee: Royal Industries, Inc., Los Angeles, Calif.

[22] Filed: Apr. 17, 1973

[21] Appl. No.: 351,904

Related U.S. Application Data

[63] Continuation-in-part of Ser. No. 152,606, June 14, 1971, abandoned, which is a continuation-in-part of Ser. No. 794,214, June 1, 1969, abandoned.

[52] U.S. Cl. .............................. 188/73.1; 188/250 B
[51] Int. Cl. ........................................... F16d 65/02
[58] Field of Search ....... 188/73.1, 73.3, 73.4, 73.5, 188/73.6, 72.4, 72.5, 72.6, 72.7, 72.8, 72.9, 250 B, 59

[56] References Cited
UNITED STATES PATENTS

| | | | |
|---|---|---|---|
| 3,027,979 | 4/1962 | Pocock | 188/73.1 |
| 3,289,795 | 12/1966 | Klaue | 188/72.4 |
| 3,396,824 | 8/1968 | Meier | 188/72.5 |
| 3,469,658 | 9/1969 | Forsythe | 188/250 B |

FOREIGN PATENTS OR APPLICATIONS

| | | | |
|---|---|---|---|
| R83,682 | 8/1964 | France | 188/250 B |
| 1,251,102 | 9/1967 | Germany | 188/72.4 |

Primary Examiner—Trygve M. Blix
Assistant Examiner—Edward R. Kazenske

[57] ABSTRACT

Each worn original pad in a vehicle disc brake assembly is replaced with a replacement pad corresponding in substantially all respects to the original pad with the exception that it is slanted at its outer edge to slightly diminish its effective friction surface by an amount sufficient to preclude its engagement with incrustations which have accumulated on the rotor disc of the brake assembly and encroached on the outer periphery of the zone of the rotor disc engaged by the original pad during its use. The friction surface of the replacement pad then seats properly on the rotor disc of the brake assembly. The slant extends only over an initial portion of the thickness of the replacement pad to permit the friction surface to attain its desired dimensions by wearing away the slanted portion in initial use of the replacement pad, so as to leave a substantial thickness of the pad with a friction surface of desired dimensions to be worn away in further use of the replacement pad.

1 Claim, 7 Drawing Figures 3,887,043

SHEET 1

INVENTOR
JACK F. HERNICK
BY
Leon Arthurs
ATTORNEY

INVENTOR:
J. F. HERNICK

PER *Leon Arthurs*
agent

REPLACEMENT PADS FOR BRAKE ASSEMBLIES

This is a Continuation-In-Part of my Application Ser. No. 152,606 filed June 14, 1971, now abandoned, for IMPROVEMENTS IN BRAKES, which is a continuation-in-part of my application Ser. No. 794,214 filed June 1, 1969, now abandoned, and relates to the replacement of disc brake pads in a disc brake assembly for braking the road wheels of road vehicles.

A known form of disc brake assembly for use upon road vehicles includes a rotor disc in the form of a hard metal annulus co-axially mounted upon and fast with the axle upon which the wheel to be braked is mounted, such disc being frequently located closely adjacent the wheel and inboard thereof with respect to the vehicle. Such an assembly also includes a caliper fixedly secured to the vehicle and straddling a part of the rotor disc. The caliper generally houses two replaceable brake pads in opposed relation on opposite axial faces of the disc for axial movement towards one another to bear upon the disc when braking pressure is applied to the pads.

The brake pads utilized in such disc brake assembly usually each comprise a pad of friction material either rivetted to, or molded in situ, upon a metal backing plate.

The rotor disc of a disc brake assembly on a road vehicle is, of course, exposed to atmosphere and is also liable to impact of materials thrown off the road during running. Since the friction surfaces of the brake pads do not generally bear upon the disc over the whole of its radial dimension, there is a tendency for materials to build up upon the disc, particularly around the radially-outer peripheries of its surfaces. It is believed that such deposition, or after a period of time, corrosion, may tend to work its way radially inwardly of the surfaces of the disc and in some cases may procure undue wear of the radially-outer axially-inner edges of the brake pads.

Furthermore, it has also been observed that the rubbing action of the pads over a period of time forms a "track" upon the rotor disc on that area thereof which is rubbed or "swept" by the pads.

Resultantly, when the original brake pads are replaced by new units after having reached the limit of their useful life, the new pads may register with the corroded areas of the rotor disc and thereby be prevented from bearing evenly upon the disc upon the application of braking pressure. Alternatively, even if no corrosion is present, it would appear for a variety of reasons that the new pads may not in any event register precisely with the track worn by the old pads on the rotor disc and so may, for this reason as well, be prevented from bearing evenly upon the disc when the braking pressure is applied.

Moreover, it is not unusual for a replacement pad to be slightly oversize or somewhat larger than the original which it replaces and so to extend radially outwardly of the track formed by the original; being resultantly prevented, at least until it is worn in, from achieving full and proper braking engagement with the brake disc or rotor on which such track is formed.

Presumably, one method of overcoming the problems would be to grind and true the rotor disc each time the pads are replaced but this would be a time-consuming procedure and would involve costly machinery to carry it out.

It will, thus, be seen that when a disc brake assembly as aforesaid required to be refitted with brake pads in the past, there was always a grave possibility that for one reason or another the replacement pads would not function with adequate effectiveness during the wearing-in period, at least, thus depriving the vehicle of a very essential safety provision.

It is, accordingly, an important object of the invention to provide a method of refitting disc brake assemblies with brake pads whereby to avoid or, at least, minimize the hazards of impaired brake function in consequence of the corrosion, or of the "tracking" of the disc, or of the oversize of the brake pads.

It is a more specific object of the invention to install in said disc brake assembly, a brake pad which is particularly constructed for replacement purposes so as to overcome the disadvantages referred to above without the need for remedial treatment of the rotor disc.

It is a still further object of the invention to provide a disc brake pad capable of utilization as a replacement in existing equipment and which, in the indicated situations, will function with normal efficiency upon the application of braking pressure.

It is a still further object to provide a method and means for refitting a disc brake assembly with brake pads having friction surfaces which will engage over substantially the whole of the friction area of the rotor disc even when such disc is corroded or otherwise defaced at the peripheries of its said friction area.

It is a yet further object to provide a method of refitting a disc brake assembly with brake pads which will act, under braking pressure, to encroach progressively upon the corrosion at the periphery of the rotor disc, if any, whereby at least to confine the corrosion within that area and even, at times, to reduce it.

To meet the above and other unspecified objects, the invention proposes to refit disc brake assemblies with replacement pads respectively provided with a line of relief precluding engagement thereof with the rotor discs of the said assemblies when the pads are moved into braking engagement therewith; the lines of relief of the pads being registrable with the radially-outer edges of the narrow peripheral zones of the rotos with which the pads are normally brakingly engageable and, preferably, each said line of relief is provided by a chamfer extending along the full length of at least one of the edges of the pads bounding its friction surface.

Other objects of the invention, more or less broad than the foregoing, will become apparent from the following description of the elements, techniques and principles of the invention which are described solely by way of example with reference to the accompanying drawings wherein.

Figure 1:
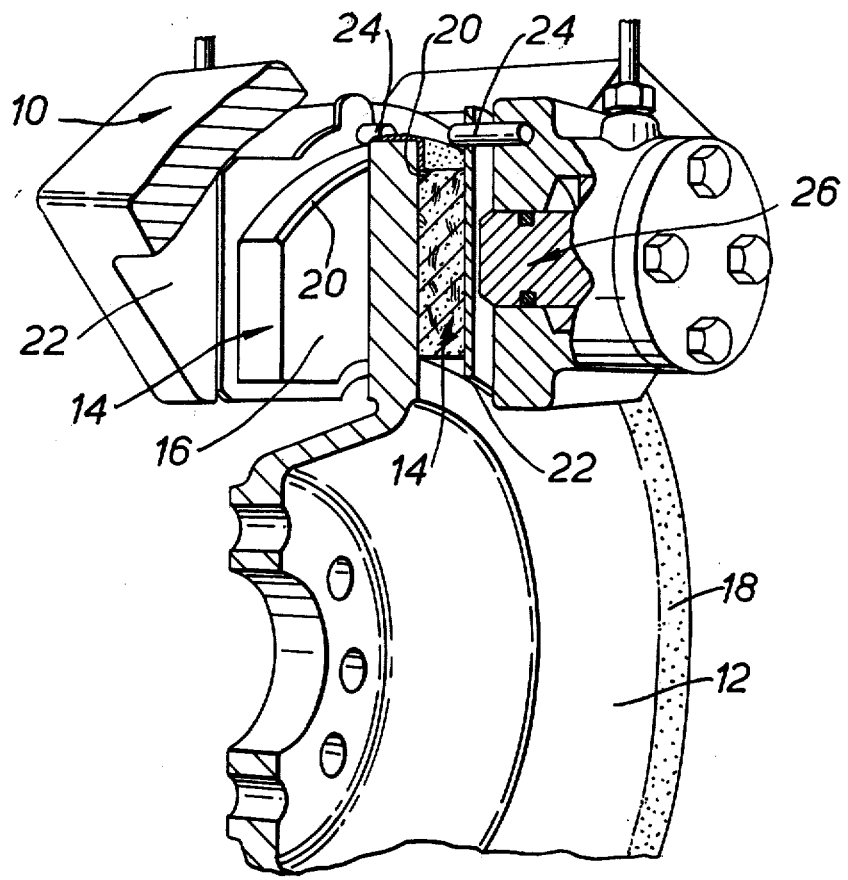
FIG. 1 is a perspective cut-away view showing a disc brake assembly including a part of the rotor disc, the caliper and the instant brake pads.

For the purpose of orientation, there is shown in FIG. 1 a disc brake assembly utilized for braking an axle carrying a road wheel of a road vehicle. As shown in said FIG. 1, the assembly includes the conventional caliper 10 straddling a rotor disc 12 of annular form mounted co-axially upon and fast with the axle to be braked (not shown), such disc 12 being generally mounted upon the axle closely adjacent the wheel and inboard thereof with respect to the vehicle. The illustrated disc brake assembly also includes a disc brake pad 14 so shaped as to seat properly and apply virtually its full effective friction surface 16 to the rotor disc 12 even when such disc is badly corroded around the peripheries of its axial faces, such corrosion being indicated at 18.

It will be understood that, in accordance with conventional practice, a pair of brake pads 14 are supported by the caliper 10 in opposed relation adjacent opposite faces of the rotor disc 12 and that the pads are movable towards one another with each pad 14 being brought into braking engagement with a narrow peripheral zone 19 on each said face of the rotor disc 12; the radially-outer edge of each such zone 19 being located closely adjacent the outer rim of the rotor disc.

In accordance with the invention, each instant brake pad 14 is relieved by a chamfer to provide a slanted outer edge 20 thereof which is generally registrable with the radially-outer edge of its associated rotor zone 19 thus precluding engagement of said outer pad edge 20 with the radially-outer edge of said zone 19 when the pad 14 is moved into braking engagement therewith. Since corrosion 18 generally covers the periphery of the disc 12, the specific outer edge 20 of the brake pad 14 which is its radially-outer axially-inner edge with reference to the disc is relieved as aforesaid; such area of relief being indicated as a chamfer.

Although said edge 20 is more accurately described as the radially-outer and axially-inner edge of the brake pad 14, it will be understood that the term outer edge 20 (or 20a as the case may be) is herein employed as a brief and specific reference to said radially-outer and axially-inner pad edge.

In common with their conventional counterparts, the instant brake pads 14 are mounted upon metal backing plates 22 which are positively engageable within the caliper 10 such as, for example, by locating pins 24, to maintain the pads in fixed relation against movement radially of the rotor disc 12 whilst allowing axial movement under the influence of braking hydraulic piston and cylinder assemblies 26.

Figure 2:
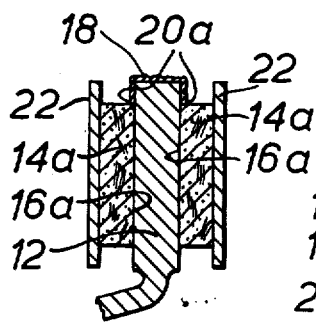
FIG. 2 is a schematic axial cross-sectional view showing a pair of conventional brake pads bearing upon a rotor disc after corrosion has occurred around the disc's periphery.

FIG. 2 of the drawing illustrates the corrosion 18 of a recently new rotor disc 12 after a period of use. Thus, while the original brake pads were initially engageable over the whole of their rubbing surfaces 16a with the rotor disc 12, corrosion is seen to have built up around the radially-outer periphery of the disc as shown at 18. During braking, this corrosion at 18 will tend to wear away the radially-outer axially-inner edges 20a of the conventional pads 14a and gradually encroach radially inwardly of the rotor disc 12.

Figure 3:
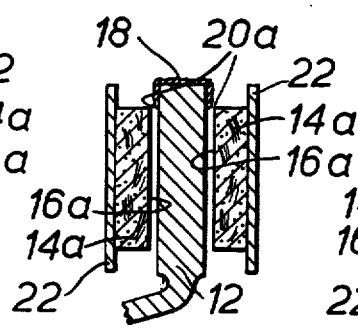
FIG. 3 is a similar view of FIG. 2 showing the effect of applying a pair of new conventional brake pads to a corroded disc.

Thus, when the pads 14a are worn to the limit of their useful life and replaced by new conventional units, the situation which may arise is as illustrated schematically in FIG. 3, wherein as will be seen, the radially-outer axially-inner edges 20a of the new conventional pads 14a overlie the area of corrosion 18 to a small extent. However, since the only possible movement of each pad 14a is axial with respect to the rotor disc 12, said conventional pads can assume no position but that shown in FIG. 3, when braking pressure is applied thereto.

In this view, the pads 14a are shown slightly spaced from the corrosion 18 for the sake of clarity; their outer edges 20a being in actual physical engagement with the said corrosion 18 when braking pressure is applied thereto.

The braking efficiency of the pads is thus seriously reduced, at least initially, until the said edges 20a of the pads 14a have been worn away to permit the full rubbing area, 16a of each pad to contact the disc 12 under the said braking pressure. This wearing-down of the edge 20a or "bedding-in" may, of course, take some considerable time with the attendant danger during such period of time of braking inefficiency.

Figure 4:
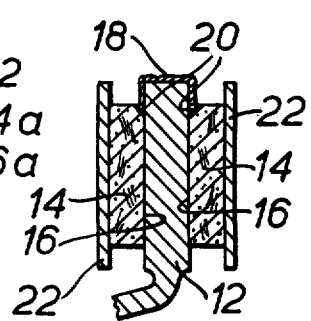
FIG. 4 is a view similar to FIGS. 2 and 3 showing the instant brake pads applied to a corroded disc.

FIG. 4, together with FIG. 1, shows brake pads 14 pursuant to the invention wherein the outer edge 20 of the friction surface 16 of each pad, which is to be positioned adjacent the corroded area 18 of the disc 12 is relieved by chamfering as contemplated by this present invention. Referring particularly to FIG. 4, it will be seen that such relief allows each chamfered pad 14 to be positioned within a caliper in such manner that virtually the whole of its rubbing face 16 is in contact with the disc 12 under breaking pressure despite the fact that corrosion 14 has occurred around the outer periphery of the rotor zone 19. Furthermore, should the area of corrosion seek to advance radially of the rotor disc, the relieved edge 20 of the brake pad will in most instances inhibit such advance by burnishing the area of corrosion and tend to confine or even reduce it; it being appreciated that it as the new pad 14 wears in the chamfering on edge 20 will narrow progressively hereby progressively increasing the portion of the pad surface 16 in contact with the disc 12.

The rotor disc 12 may, of course, also be liable to corrosion along its friction surfaces adjacent its radially-inner periphery as well as along its radially-outer periphery but it is found in use that deposition or corrosion is not so severe at this position as it is at the radially-outer periphery of the disc. Thus, although it may also be desirable to relieve the pad along its axially and radially-inner edge, such relief is not so essential as that along its radially-outer edge 20.

The replacement pad 14 will, of course, by of any suitable proportions and shape according to the design specified for each particular application; having the same dimensions and contours as the conventional pad 14a; the overall area of friction surface, i.e.—that of the axially-inner surface 16 of the pad, being reasonably critical for each application to ensure correct braking balance between the wheels to be braked.

Frequently both the radially-inner and outer peripheries of the pad are arcuate and conform, at least approximately, to the curvature of the radially-inner and outer peripheries of the zone 19 respectively. In such a case, at least, the edge 20 of each pad is relieved by providing a chamfer in such edge 20.

However, in some applications a brake pad is utilized which has a linear radially-outer periphery. In such a construction it may only be necessary to relieve the radially-outer axially inner edge adjacent the corners. The relief at the corners only in such a construction would be necessary since it is only the corners which would bear, were they not relieved, upon the corroded portion of the rotor disc. The remainder of the radially-outer axially inner edge of the pad would, of course, be disposed radially inwardly of the corroded portion of the disc.

Although the foregoing description has been primarily concerned with the problems which may occur consequent upon corrosion of the periphery of the rotor disc, it should be realized that certain problems may still arise even when corrosion does not take place and may also be met by the replacement pads 14 of the invention for the conventional pads 14a.

Figure 5:
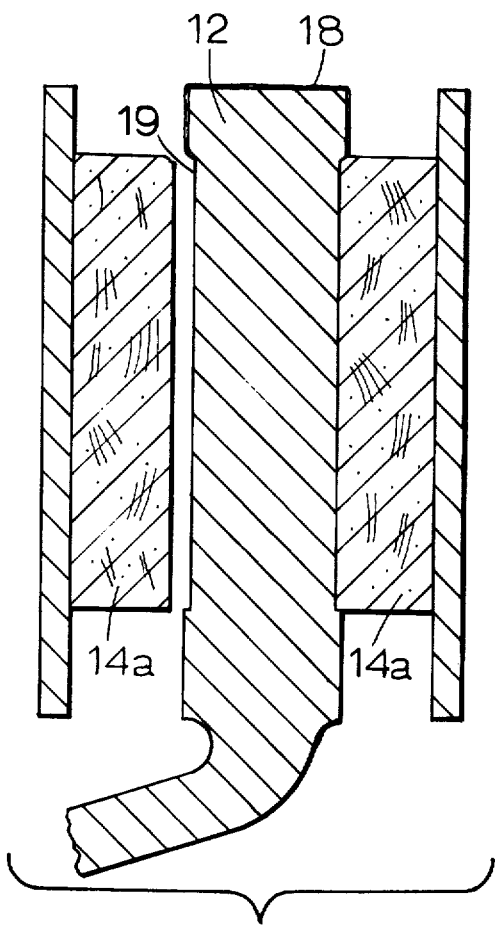
FIG. 5 is a view corresponding somewhat to FIG. 2 but considerably enlarged to reveal the track aforesaid worn by the brake pads into the rotor disc.
Figure 6:
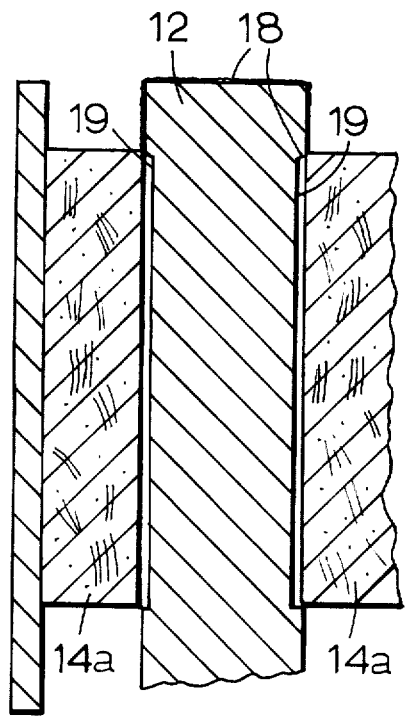
FIG. 6 is a view corresponding to FIG. 5 showing the same detail of the disc brake assembly fitted with oversize replacement pads.
Figure 7:
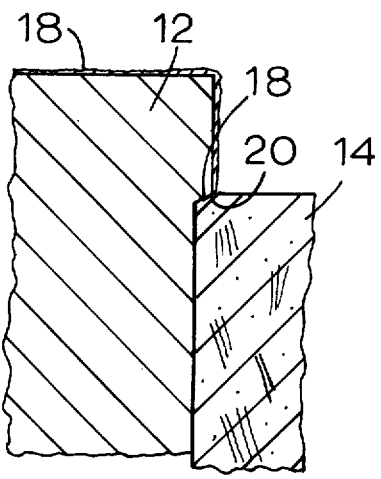
FIG. 7 is a view of a fragment of the structure shown in FIG. 6 wherein the replacement pad is in accordance with the present invention.

For example, it is believed that, after a period of use, the brake pads may wear an annular track in the friction zone 19 of the rotor disc substantially as shown in exaggerated form in FIGS. 5, 6, and 7 replaced with conventional pads their rubbing surfaces may not fall precisely within such track. Such a situation may, for example, be due to manufacturing exigencies or to play due to wear within the caliper; the result being that the rubbing surfaces of the pads are prevented, at least initially, from bearing over their effective area upon the disc zones 19. It will be realized, however, that this problem can be overcome in the same manner as problems incidental to corrosion by the herein visualized chamfering of the outer edges 20 of the improved pads 14.

Obviously the brake pads 14 of the invention offer very little if any benefit to a new, inworn and uncorroded, disc brake assembly: the chief virtue thereof being as a replacement in due course for the conventional pads 14a which form original parts of such assembly. Thus, it will be equally obvious that the main inventive concept lies not alone in the provision of chamfered brake pads 14 but in their use as replacement for the aforesaid conventional pads 14 when the brakes under consideration require to be refitted with fresh pads.

Obviously, also, the replacement pads 14 have all the requisite dimensions, contours, and other properties of the conventional pads 14, except that, when viewed in cross-section, said conventional pads 14a exhibit generally square corners formed by their edges, and friction surfaces 16a, whereas in contradistinction thereto, the corresponding corners, of the present replacement pad 14 are chamferred as shown at 20.

Thus, it will be seen that by replacing conventional square-cornered brake pads 14a with the improved chamferred-corner pads 14 according to the present inventive concept there will be avoided all braking impairment resulting from corrosion tracking or brake pad oversize as hereinbefore set forth or from any combination thereof.

Ideally, the rotor of a disc brake should be removed and "trued" in a lathe whenever the brake pads are replaced; the truing of the rotor being necessary to maintain the parallelism of its surfaces — which is essential to good brake function — as well as to remove the debris on "scale" which builds up on the rotor at the periphery of the annular seat which is engaged or "swept" by each brake pad when it is pressed against the rotor. This scale usually encroaches on the said seat to a greater or lesser degree; creating high spots which prevent conventional replacement pads from seating properly on the rotor and thereby producing poor brake action at least for the first several thousand miles following the installation of the conventional replacement pad.

Owing to the relatively high cost of removing and truing the rotor disc, many servicemen — and owners — tend to omit this step unless it is inescapably necessary. Thus, conventional brake pads used to replace the worn pads cannot seat properly on the rotor which, of course, leads to very poor brake function until the replacement pads have been "run-in." This situation, resulting from the elimination or omission of the rotor truing step when brake pads are replaced is by no means rare or unusual.

Conversely, when the replacement pads are relieved or chamferred according to the present invention, they avoid the high spots and are hence enabled to seat properly on the rotor.

Of course, the chamfer tends initially to reduce the effective braking area somewhat. However, when the brake pads have been in use for a few thousand miles, the chamfer is bound to be obliterated — thereby restoring full braking efficiency — with most of the scale being contemporaneously wiped from the rotor in the process; the wiping of the scale and the obliteration of the chamfer taking place more or less simultaneously while the replacement pad according to the invention is being run-in.

In summary, therefore, the present invention visualizes a method of replacing brake pads in a motor vehicle having a disc brake assembly for frictional engagement with a rotor disc, the method comprising the steps of; installing an original set of brake pads in said disc brake assembly, each said pad having a friction surface engageable with a friction zone on said rotor disc bordered by inner and outer peripheries to which the edges of the original brake pad reach when it is in engagement with said friction zone; operating said motor vehicle and the disc brake assembly over a period of time producing wearing of said brake pad and incrustations encroaching on said friction zone at its outer periphery, at least, thereby reducing the effective radial width of said friction zone below its original width; replacing said worn original pad with a replacement pad corresponding in substantially all respects to the original pad with the exception that it is relieved or chamferred at its outer edge, at least, thereby slightly diminishing its effective friction surface and precluding its engagement with said incrustations enabling its friction surface to seat properly on said friction zone, the relief being very slight permitting said replacement pad to regain its original and correct dimensions in the course of its use with progressive burnishing of said rotor disc to restore full braking cooperation therewith.

It will be appreciated that the hereinbefore described embodiments of the invention have been selected solely for the expository purpose hereof and should not be construed in a limiting sense; various modifications being readily suggestible to those skilled in the art and the true scope of the invention being restricted only by the claims hereinafter set forth.

What I claim is:

1. In a motor vehicle having a disc brake assembly for frictional engagement with a rotor disc, the steps of:

installing an original set of brake pads in said disc brake assembly, each said pad having a friction surface engageable with a friction zone on said rotor disc bordered by inner and outer peripheries to which the edges of the original brake pad reach when it is in engagement with said friction zone;

operating said motor vehicle and the disc brake assembly over a period of time producing wearing of said brake pad and incrustations encroaching on said friction zone at its outer periphery, at least, thereby reducing the effective radial width of said friction zone below its original width;

replacing said worn original pad with a replacement pad corresponding in substantially all respects to the original pad with the exception that it is slanted at its outer edge to slightly diminish its effective friction surface by an amount sufficient to preclude its engagement with said incrustations and enable its friction surface to seat properly on said friction zone, the slant extending only over an initial portion of the thickness of the replacement pad to permit the friction surface to attain its desired dimensions by wearing away of the slanted portion in initial use of the replacement pad and leaving a substantial thickness of the pad with a friction surface of desired dimensions to be worn away in further use of the replacement pad.

* * * * *